(12) United States Patent
Hsu et al.

(10) Patent No.: US 7,712,945 B2
(45) Date of Patent: *May 11, 2010

(54) PRISM SHEET AND BACKLIGHT MODULE USING THE SAME

(75) Inventors: Tung-Ming Hsu, Taipei Hsien (TW); Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/946,867

(22) Filed: Nov. 29, 2007

(65) Prior Publication Data

US 2009/0080188 A1    Mar. 26, 2009

(30) Foreign Application Priority Data

Sep. 21, 2007    (CN)    ................ 2007 1 0201814

(51) Int. Cl.
*F21V 7/04* (2006.01)

(52) U.S. Cl. ................................ 362/620; 362/333

(58) Field of Classification Search ................ 362/33, 362/97, 326, 330, 333, 336, 339, 558, 559, 362/606, 617, 619, 620; 349/62–64; 359/619, 359/626

See application file for complete search history.

(56) References Cited

U.S. PATENT DOCUMENTS

| 7,303,323 | B2 * | 12/2007 | Choi et al. | 362/606 |
| 7,445,361 | B1 * | 11/2008 | Hsu et al. | 362/333 |
| 2008/0130117 | A1 * | 6/2008 | Hsu et al. | 359/599 |

FOREIGN PATENT DOCUMENTS

| CN | 1716027 A | 1/2006 |
| CN | 101004461 A | 7/2007 |
| CN | 101025518 A | 8/2007 |

* cited by examiner

*Primary Examiner*—Hargobind S Sawhney
(74) *Attorney, Agent, or Firm*—Frank R. Niranjan

(57) ABSTRACT

An exemplary prism sheet includes a transparent main body. The main body includes a first surface and a second surface. The first surface is opposite to the second surface. A plurality of elongated V-shaped protrusions are formed on the first surface. A plurality of micro-depressions are defined in the second surface. Each micro-depression is defined by at least three connecting inner sidewalls. A transverse width of each inner sidewall of each micro-depression progressively decreases with increasing distance from the second surface. A backlight module using the present prism sheet is also provided.

20 Claims, 10 Drawing Sheets

PRISM SHEET AND BACKLIGHT MODULE USING THE SAME

CROSS-REFERENCE TO RELATED APPLICATIONS

This application is related to four co-pending U.S. patent applications, which are: application Ser. No. 11/938,307 and Ser. No. 11/938,308, filed on Nov. 12, 2007, and both entitled "PRISM SHEET AND BACKLIGHT MODULE USING THE SAME"; application Ser. No. 11/940,328, filed on Nov. 15, 2007, and entitled "PRISM SHEET AND BACKLIGHT MODULE USING THE SAME", and application serial no. [to be determined], entitled "PRISM SHEET AND BACKLIGHT MODULE USING THE SAME". In the co-pending application, the inventors are Tung-Ming Hsu and Shao-Han Chang. The co-pending application has the same assignee as the present application. The disclosure of the above identified application is incorporated herein by reference.

BACKGROUND OF THE INVENTION

1. Field of the Invention

The present invention relates to a prism sheet for use in, for example, a backlight module, the backlight module typically being employed in a liquid crystal display (LCD).

2. Discussion of the Related Art

In a liquid crystal display device (LCD device), liquid crystal is a substance that does not itself illuminate light. Instead, the liquid crystal relies on light received from a light source to display information. In the case of a typical liquid crystal display device, a backlight module powered by electricity supplies the needed light.

FIG. 8 represents a typical direct type backlight module 100. The backlight module 100 includes a housing 11, a plurality of lamps 12 positioned above a base of the housing 11 for emitting light, and a light diffusion plate 13 and a prism sheet 10 stacked on top of the housing 11 in that order. Inside walls of the housing 11 are configured for reflecting certain of the light upwards. The light diffusion plate 13 includes a plurality of dispersion particles (not shown) therein. The dispersion particles are configured for scattering light, and thereby enhancing an uniformity of light exiting the light diffusion plate 13.

Referring to FIG. 9, the prism sheet 10 includes a base layer 101 and a prism layer 102 formed on the base layer 101. The prism layer 102 contains a plurality of parallel prism lenses 103 having a triangular cross section. The prism lenses 103 are configured for collimating received light to a certain extent. Typically, a method of manufacturing the prism sheet 10 includes following steps. First, an ultraviolet cured transparent melted resin is coated on the base layer 101, and then the ultraviolet cured transparent melted resin is solidified to form the prism lenses 103.

In use, light from the lamps 12 enters the prism sheet 10 and becomes scattered. Thus, scattered light leaves the light diffusion plate 13 to the prism sheet 10. The scattered light then travels through the prism sheet 10 and is refracted out at the prism lenses 103 of the prism sheet 10. Thus, the refracted light leaving the prism sheet 10 is concentrated by the prism lenses 103 and increases a brightness (illumination) of the prism sheet 10. The refracted light then propagates into an LCD panel (not shown) positioned above the prism sheet 10.

When the light is scattered at the light diffusion plate 13, scattered light enters the prism sheet at different angles of incidence. Referring to FIG. 10, when scattered light generally travels through the prism sheet 10 at different angles of incidence, the scattered light generally travels through the prism sheet 10 along three light paths. A first light path the prism lenses 103 at angles closer to normal of the base layer. A second light path (such prism lenses 103 at angles closer to normal of an outer surface of the prism lenses 103. Both the first light path and the second light path increases light utilization efficiency of the backlight model. However, a third light path (such as $a_5$, $a_6$) enters the prism sheets at certain angles such that when leaving the light prism sheet at the prism lenses 103, light undergoes internal reflection at the prism lenses 103, or re-enters the prism sheet 10 at an outer surface of adjacent prism lenses. Thus, light traveling along the third light path will eventually exit the prism sheet at the same side the light enters. The third light path does not contribute to the light utilization efficiency of the backlight module 100. Furthermore, the third light path of light is consumed in interface propagation, insulting decreasing a brightness of the backlight module 100.

What is needed, therefore, is a new prism sheet and a backlight module using the prism sheet that can overcome the above-mentioned shortcomings.

SUMMARY

In one aspect, a prism sheet according to a preferred embodiment includes a transparent main body. The main body includes a first surface and a second surface. The first surface is opposite to the second surface. A plurality of elongated V-shaped protrusions are formed on the first surface. A plurality of micro-depressions are defined in the second surface. Each micro-depression is defined by at least three connecting inner sidewalls. A transverse width of each inner sidewall of each micro-depression progressively decreases with increasing distance from the second surface.

In another aspect, a backlight module according to a preferred embodiment includes a plurality of lamps, a light diffusion plate and a prism sheet. The light diffusion plate is positioned above the lamps and the prism sheet is stacked on the light diffusion plate. The prism sheet is same as described in a previous paragraph.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present prism sheet and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present prism sheet and backlight module, in detail.

Figure 1:
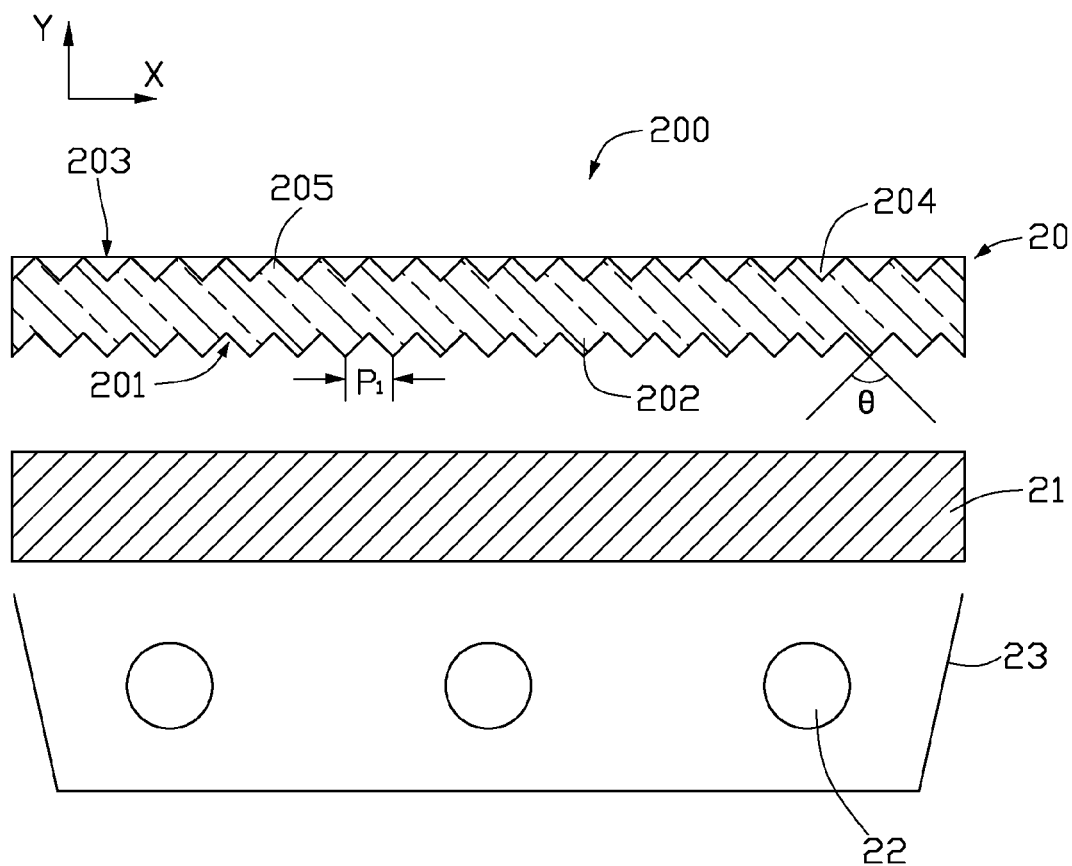
FIG. 1 is a side, cross-sectional view of a backlight module using a prism sheet according to a first preferred embodiment of the present invention.

Referring to FIG. 1, a backlight module 200 in accordance with a first preferred embodiment of the present invention is shown. The backlight module 200 includes a prism sheet 20, a light diffusion plate 21, a plurality of lamps 22, and a housing 23. The lamps 22 are regularly aligned above a base of the housing 23 for emitting light. The light diffusion plate 21 and the prism sheet 20 are stacked on the top of the housing 23 in that order.

Figure 2:
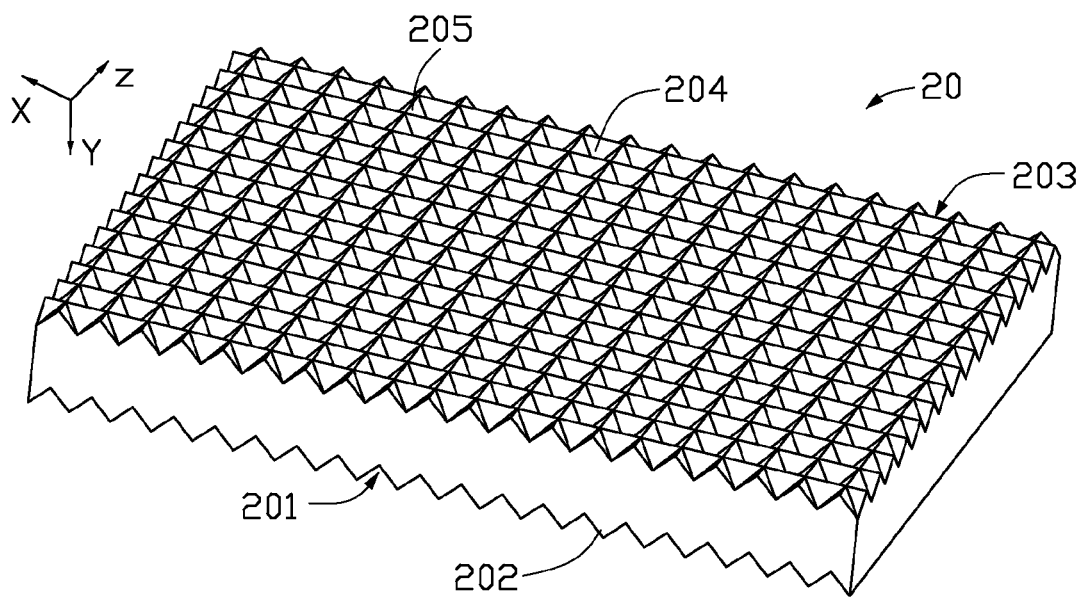
FIG. 2 is an isometric view of the prism sheet of FIG. 1.
Figure 3:
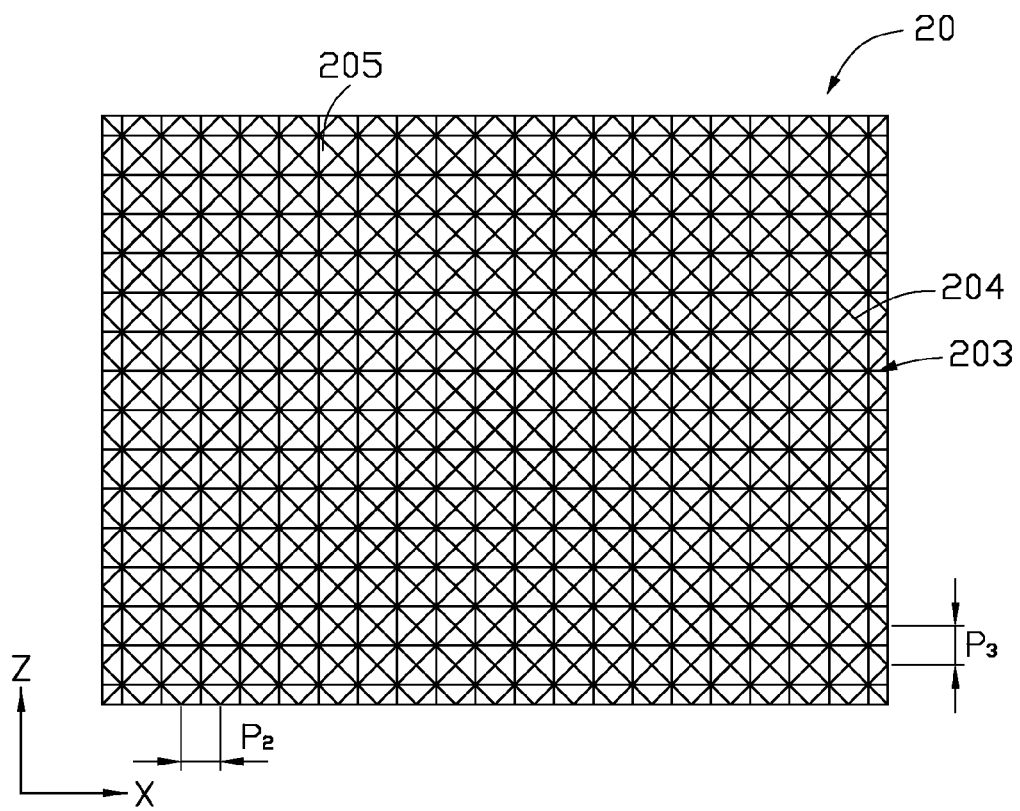
FIG. 3 is a top plan view of the prism sheet of FIG. 2.
Figure 4:
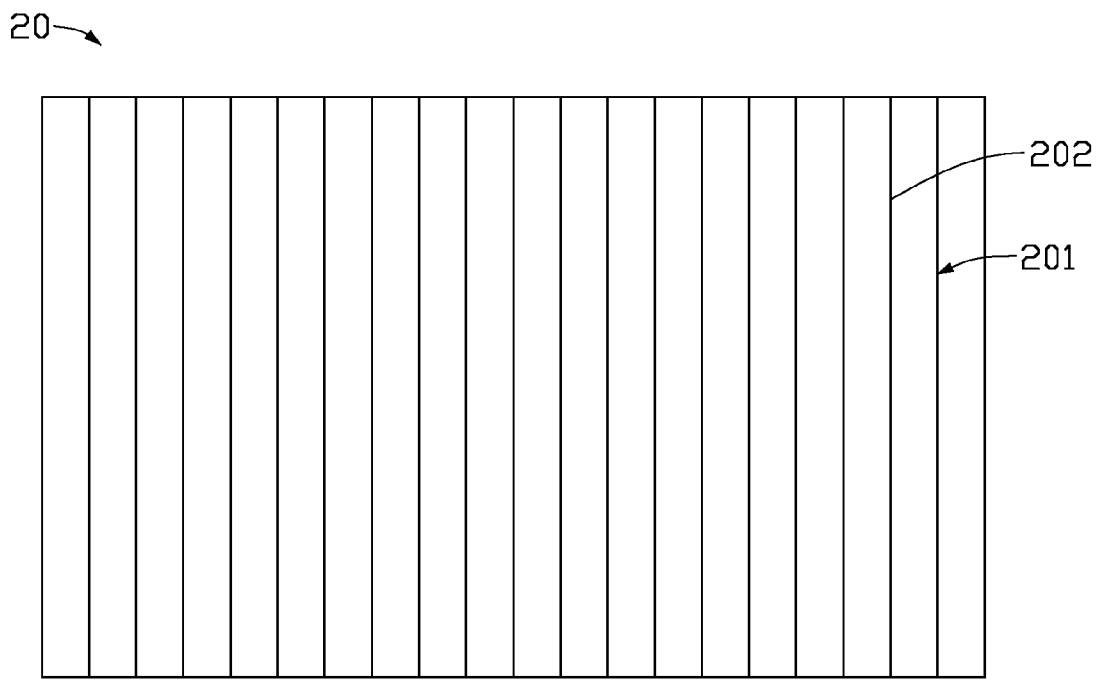
FIG. 4 is a bottom plan view of the prism sheet of FIG. 2.

Referring to FIGS. 2 through 4, the prism sheet 20 includes a transparent main body. The main body includes a first surface 201 and a second surface 203. The first surface 201 and the second surface 203 are on opposite sides of the main body. A plurality of elongated V-shaped protrusions 202 are formed on the first surface 201. A plurality of micro-depressions 204 are defined in the second surface 203. The prism sheet 20 is stacked on the light diffusion plate 21 in a way such that first surface 201 is adjacent to the light diffusion plate 21, and the second surface 203 faces away from the light diffusion plate 21. Each micro-depression 204 has a shape like an inverted pyramid and forms four triangular inner sidewalls connected with each other. In the illustrated embodiment, each micro-depression 204 is a square pyramidal groove forming four isosceles triangular inner sidewalls. A transverse width of each inner sidewall progressively decreases with increasing distance from the second surface 203.

The elongated V-shaped protrusions 202 are configured for enabling the first surface to converge incident light from the lamps 22 entering to the prism sheet 20 to a certain extent (hereafter first light convergence). Each of the plurality of elongated V-shaped protrusions 202 is an elongated prism (or ridge) that extends along a direction parallel to a sidewall of the prism sheet 20. The elongated V-shaped protrusions 202 are aligned side by side on the first surface 201 of the prism sheet 20. A pitch $P_1$ between adjacent elongated V-shaped protrusions 202 is configured to be in a range from about 0.025 millimeters to about 1 millimeter. A vertex angle θ of each elongated V-shaped protrusion 202 is configured to be in a range from about 50 degrees to about 120 degrees. In alternative embodiments, adjacent elongated V-shaped protrusions 202 can be spaced apart from each other by a predetermined interval.

The micro-depressions 204 are also configured for enabling the second surface 203 to converge light exiting the second light surface 204 (hereafter second light convergence). The micro-depressions 204 are distributed on the second surface 203 in a matrix manner. Each micro-depression 204 is a square pyramidal groove and has four isosceles triangular inner sidewalls. Sidewalls of adjacent micro-depressions 204 are joined, forming a crest. The crests extend across the prism sheet 20 in an X-direction or a Z-direction relative a side of the prism sheet 20. A pitch $P_2$ between adjacent micro-depressions 204 along the X-axis direction is configured to be in a range from about 0.025 millimeters to about 1 millimeter. A pitch $P_3$ between adjacent micro-depressions 204 along the Z-axis direction is configured to be in a range from about 0.025 millimeters to about 1 millimeter. An angle formed by sidewalls on opposite sides of each of the micro-depressions 204 is in a range from 60 degrees to 20 degrees.

A thickness of the prism sheet 20 is preferably in a range from about 0.5 millimeters to about 3 millimeters. The prism sheet 20 can be made of transparent material selected from the group consisting of polycarbonate (PC), polymethyl methacrylate (PMMA), polystyrene (PS), copolymer of methylmethacrylate and styrene (MS), and any suitable combination thereof.

Again referring to FIG. 1, the lamps 22 can be point light sources such as light emitting diodes or linear light sources such as cold cathode fluorescent lamps. In the illustrated embodiment, the lamps 22 are cold cathode fluorescent lamps. The interior of the housing is configured to be highly reflective.

In the backlight module 200, when light enters the prism sheet 20 via the first surface 201, the light undergoes the first light convergence at the first surface 201. Then the light further undergoes the second convergence at the second surface 203 before exiting the prism sheet 20. Thus, a brightness of the backlight module 200 is increased. In addition, due to the micro-depressions 204, the light exiting the prism sheet 20 would mostly propagate along direction parallels close to the Y-direction. At the same time, few or less of the light would travel along direction parallels close to the X-direction, minimizing light energy loss. Thus, the light energy utilization rate of the backlight module 200 is high.

Moreover, in contrast to the conventional prism sheet, the prism sheet 20 of the present invention is integrally formed by injection molding technology. Injection molding technology allows the prism sheet 20 to be easier to mass-produce than that of the conventional prism. Furthermore, because the prism lenses of the conventional prism sheet are formed by solidifying melted ultraviolet-cured transparent resin, in use, the prism lenses are easily damaged and/or scratched due to poor rigidity and mechanical. In contrast to the conventional prism sheet, the present prism sheet has better rigidity and mechanical strength than that of the conventional prism sheet. Therefore, the present prism sheet 20 has a relative high reliability.

Figure 5:
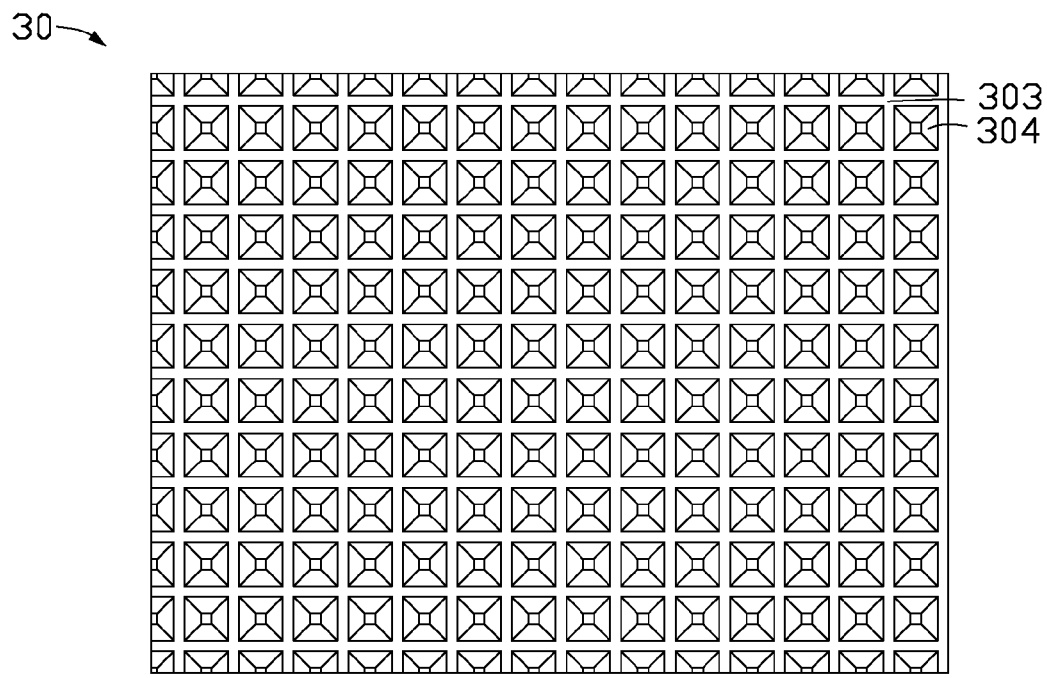
FIG. 5 is a top plan view of a prism sheet according to a second preferred embodiment of the present invention.

Referring to FIG. 5, a prism sheet 30 in accordance with a second preferred embodiment of the present invention is shown. The prism sheet 30 is similar in principle to the prism sheet 20. A plurality of micro-depressions 304 are defined in the second surface 303 in a matrix manner. However, each micro-depression 304 includes four isosceles trapezium inner sidewalls. Shapes and sizes of inner sidewalls are same. Thereby, the four inner sidewalls and a bottom wall cooperatively define a frustum of an inverted square pyramid. The micro-depressions 304 are aligned apart on second surface 303.

Figure 6:
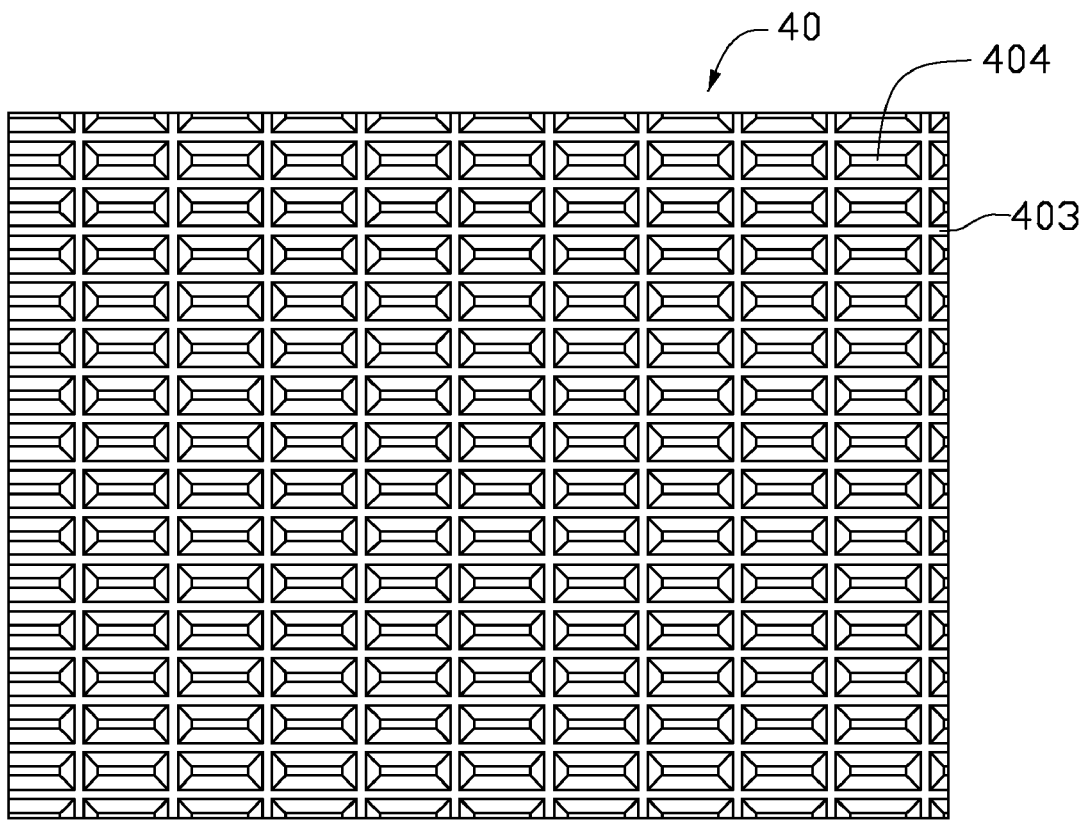
FIG. 6 is a top plan view of a prism sheet according to a third preferred embodiment of the present invention.

Referring to FIG. 6, a prism sheet 40 in accordance with a third preferred embodiment of the present invention is shown. The prism sheet 40 is similar in principle to the prism sheet 30. A plurality of micro-depressions 404 are defined in the second surface 403 in a matrix manner. However, four inner sidewalls and a bottom of each of micro-depressions 404 cooperatively define a frustum of an inverted rectangular pyramid. In the illustrated embodiment, each micro-depression 404 is substantially elongate. More particularly, an area of each two opposing long inner surfaces of each micro-depression 404 is substantially larger than that of each of the other two opposing short inner surfaces of the micro-depression 404.

Figure 7:
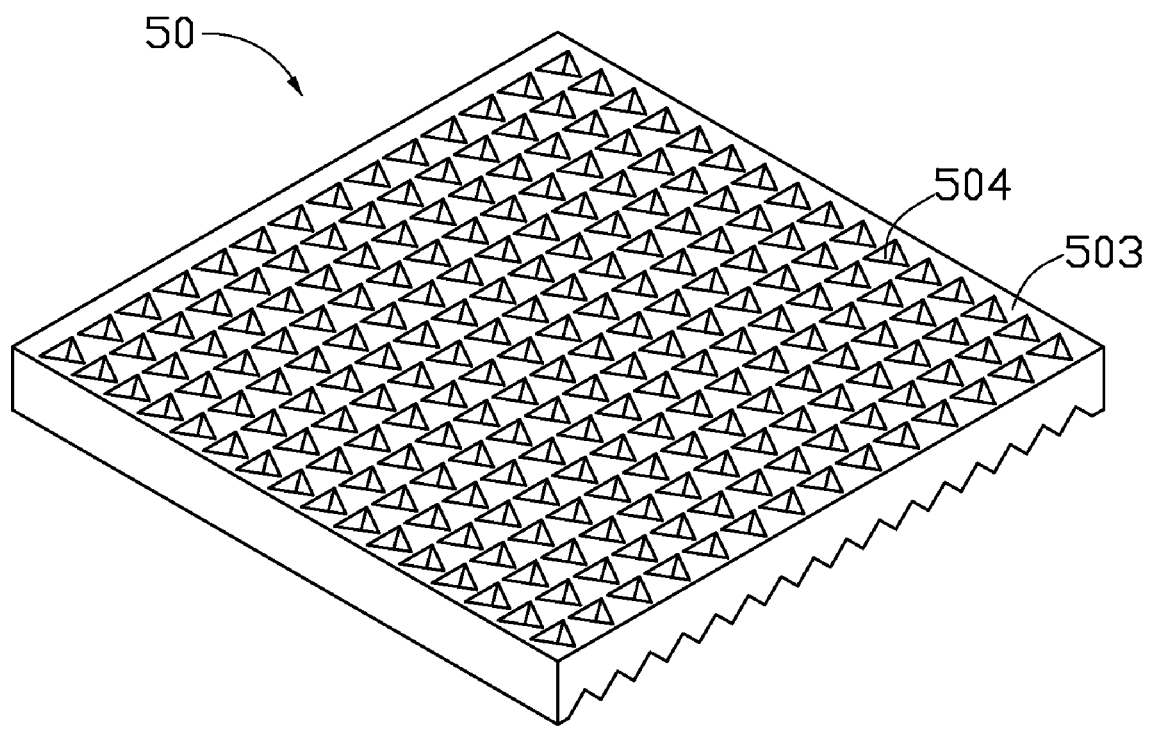
FIG. 7 is an isometric view of a prism sheet according to a fourth preferred embodiment of the present invention.
Figure 8:
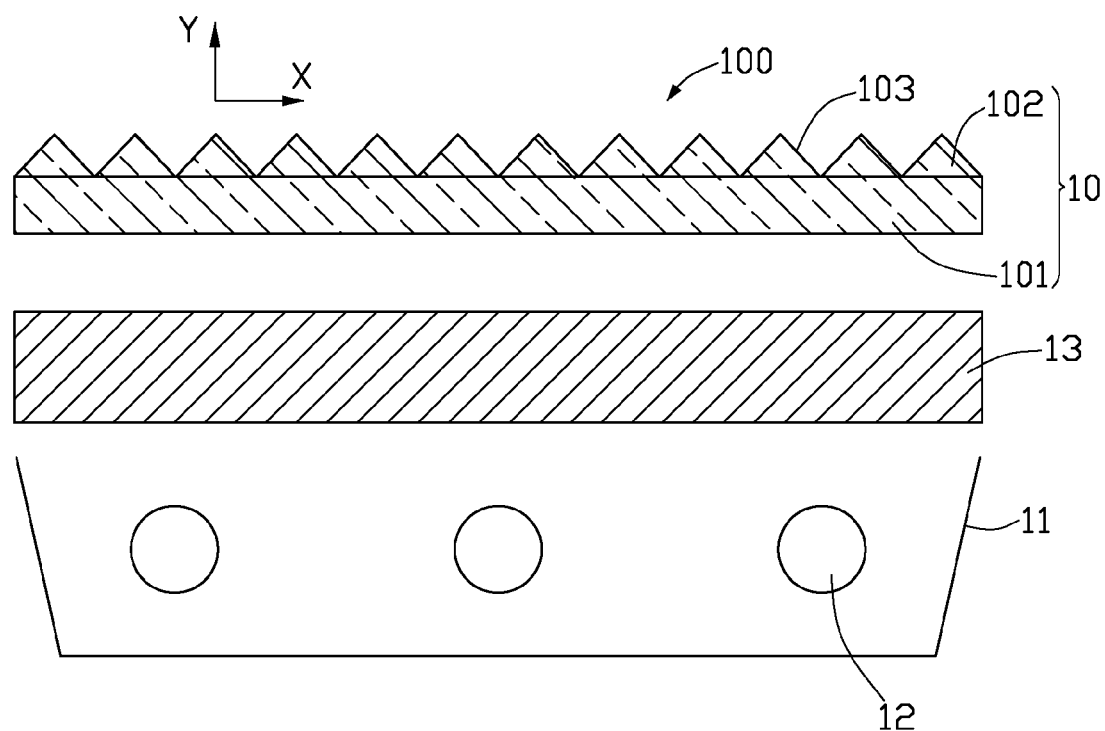
FIG. 8 is a side cross-sectional view of a conventional backlight module employing a typical prism sheet.
Figure 9:
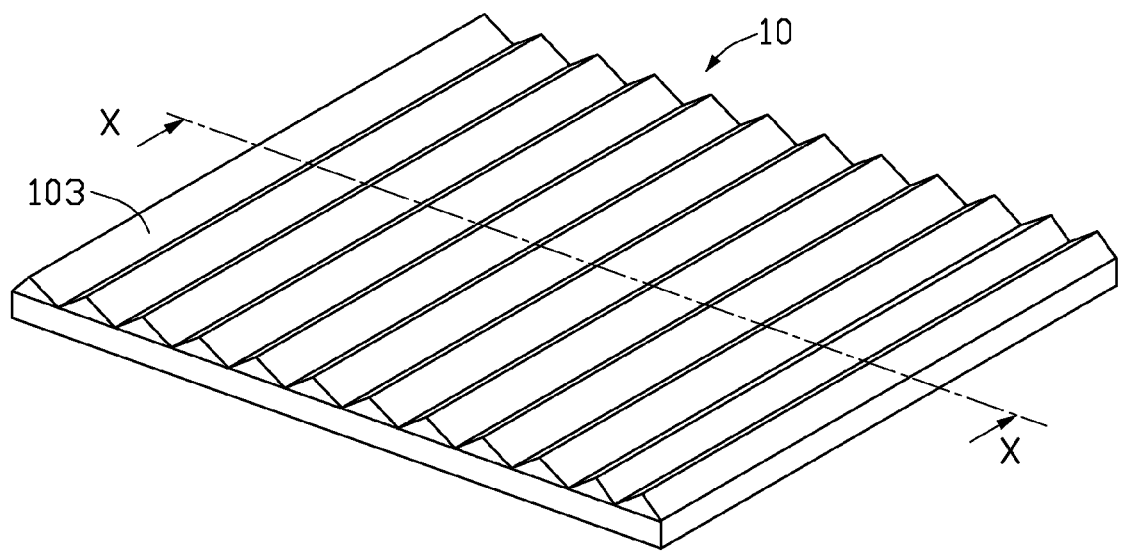
FIG. 9 is an isometric view of the prism sheet shown in FIG. 7.
Figure 10:
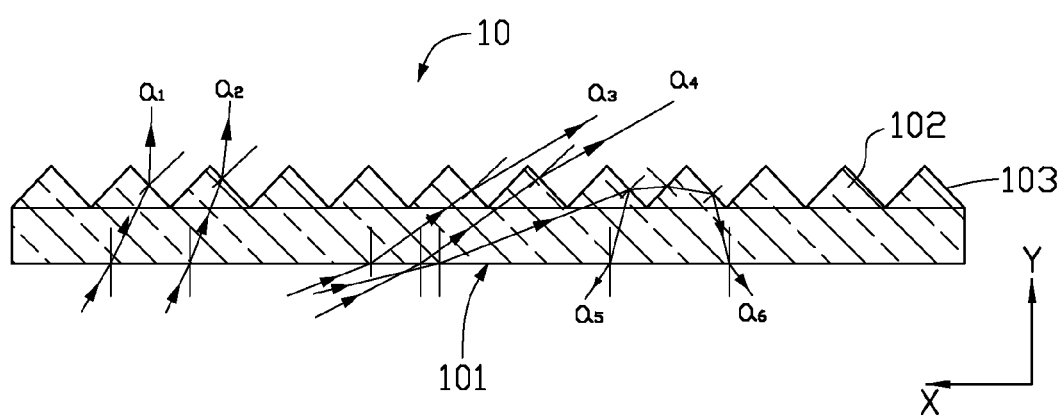
FIG. 10 is side, cross-sectional view of the prism sheet of FIG. 7, taken along line VIII-VIII, showing light transmission paths.

Referring to FIG. 7, a prism sheet according to a fourth embodiment is shown. The prim sheet 50 is similar in principle to the prism sheet 30. A plurality of micro-depressions 504 are defined in the second surface 503 in a matrix manner. However, each micro-recess 503 is an inverted triangular pyramid in shape. In an alternative embodiment, each micro-recess 531 can be a frustum of an inverted triangular pyramid in shape.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A prism sheet comprising:
    a transparent main body having:
    a first surface,
    a second surface opposite to the first surface,
    a plurality of elongated V-shaped protrusions formed on the first surface, and a plurality of micro-depressions defined in the second surface, each of micro-depressions is defined by at least three connecting inner sidewalls, wherein a transverse width of each inner sidewall progressively decreases with increasing distance from the second surface.

2. The prism sheet according to claim 1, wherein the micro-depressions are selected from a group consisting of pyramidal groove and frustum of pyramidal groove.

3. The prism sheet according to claim 2, wherein an angle formed by sidewalls on opposite sides of each of micro-depression is in a range from about 60 degrees to about 120 degrees.

4. The prism sheet according to claim 1, wherein a pitch of the adjacent micro-depressions is configured to be in a range from about 0.025 millimeters to about 1 millimeter.

5. The prism sheet according to claim 1, wherein a thickness of the prism sheet is in a range from about 0.5 millimeters to about 3 millimeters.

6. The prism sheet according to claim 1, wherein the micro-depressions are distributed on the second surface in a matrix manner.

7. The prism sheet according to claim 6, wherein sidewalls of adjacent micro-depressions are joined and form a crest, the crests extend across the prism sheet in a direction relative to a side of the prism sheet.

8. The prism sheet according to claim 1, wherein the elongated V-shaped protrusions are aligned side by side on the first surface of the prism sheet.

9. The prism sheet according to claim 1, wherein a pitch between adjacent elongated V-shaped protrusions is a range from about 0.025 millimeters to about 1 millimeter.

10. The prism sheet according to claim 1, wherein a vertex angle of each elongated V-shaped protrusion is in a range from about 50 degrees to about 120 degrees.

11. The prism sheet according to claim 1, wherein the prism sheet is made of transparent material selected from the group consisting of polycarbonate, polymethyl methacrylate, polystyrene, copolymer of methylmethacrylate and styrene, and any combination thereof.

12. A backlight module comprising:
    a plurality of lamps;
    a light diffusion plate positioned above the lamps; and
    a prism sheet positioned on the light diffusion plate, the prism sheet including a transparent main body having
    a first surface,
    a second surface opposite to the first surface, and
    a plurality of elongated V-shaped protrusions formed on the first surface, and a plurality of micro-depressions defined in the second surface, wherein each of micro-depression is defined by at least three connecting inner sidewalls, wherein a transverse width of each inner sidewall progressively decreases with increasing distance from the second surface.

13. The backlight module according to claim 12, wherein the micro-depressions are selected from a group consisting of pyramidal groove and frustum of pyramidal groove.

14. The backlight module according to claim 13, wherein an angle formed by sidewalls on opposite sides of each of micro-depression is in a range from about 60 degrees to about 120 degrees.

15. The backlight module according to claim 12, wherein a thickness of the prism sheet is in a range from about 0.5 millimeters to about 3 millimeters.

16. The backlight module according to claim 12, wherein the micro-depression are distributed on the second surface in a matrix manner.

17. The backlight module according to claim 16, wherein sidewalls of adjacent micro-depressions are joined and form a crest, the crests extend across the prism sheet in a direction relative to a side of the prism sheet.

18. The backlight module according to claim 12, wherein the elongated V-shaped protrusions are aligned side by side on the first surface of the prism sheet.

19. The backlight module according to claim 12, wherein a pitch between adjacent elongated V-shaped protrusions is a range from about 0.025 millimeters to about 1 millimeter.

20. The backlight module according to claim 12, wherein a vertex angle of each elongated V-shaped protrusion is in a range from about 50 degrees to about 120 degrees.

\* \* \* \* \*